(12) United States Patent
Ferrara (10) Patent No.: US 8,360,997 B2
(45) Date of Patent: Jan. 29, 2013

(54) ROBOT ARM

(75) Inventor: Paolo Ferrara, Kematen an der Krems (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 1030 days.

(21) Appl. No.: 12/224,104

(22) PCT Filed: Feb. 23, 2007

(86) PCT No.: PCT/AT2007/000097
§ 371 (c)(1),
(2), (4) Date: Nov. 3, 2008

(87) PCT Pub. No.: WO2007/095662
PCT Pub. Date: Aug. 30, 2007

(65) Prior Publication Data
US 2009/0182436 A1      Jul. 16, 2009

(30) Foreign Application Priority Data

Feb. 24, 2006  (AT) .................................. A 316/2006
Sep. 27, 2006  (AT) ................................ A 1607/2006

(51) Int. Cl.
*A61H 1/00* (2006.01)
*A61H 1/02* (2006.01)
*A61H 5/00* (2006.01)

(52) U.S. Cl. ......................................................... 601/5

(58) Field of Classification Search ................ 601/5, 33; 623/57; 74/490.01–490.06; 700/245
See application file for complete search history.

(56) References Cited

U.S. PATENT DOCUMENTS

| | | | |
|---|---|---|---|
| 4,615,260 A | 10/1986 | Takagi et al. | |
| 4,784,042 A | 11/1988 | Paynter | |
| 4,846,466 A | 7/1989 | Stima | |
| 4,984,568 A | 1/1991 | Persaud | |
| 5,083,552 A | 1/1992 | Lipowitz | |
| 5,179,939 A * | 1/1993 | Donovan et al. | 601/33 |
| 5,417,643 A | 5/1995 | Taylor | |
| 5,551,525 A * | 9/1996 | Pack et al. | 180/8.6 |
| 6,168,634 B1 | 1/2001 | Schmitz | |
| 6,532,400 B1 | 3/2003 | Jacobs | |
| 7,066,896 B1 * | 6/2006 | Kiselik | 601/5 |
| 7,252,644 B2 * | 8/2007 | Dewald et al. | 601/5 |
| 8,012,107 B2 * | 9/2011 | Einav et al. | 601/5 |

(Continued)

FOREIGN PATENT DOCUMENTS

| | | |
|---|---|---|
| BR | 9 303 695 A1 | 4/1995 |
| DE | 3630822 A1 | 3/1987 |

(Continued)

*Primary Examiner* — Kristen Matter
(74) *Attorney, Agent, or Firm* — Muirhead and Saturnelli, LLC (57) ABSTRACT

A robot arm formed from one or more optionally interlinked active pivoted levers, wherein a base is fixed to the one end of a support and a pivoting piece is pivotably mounted on the second end of the support with pneumatic muscles running form the base to the pivoting piece. Individual pneumatic muscles engage on opposing sides of the pivot axis of the pivoting piece and the base of a pivoting lever is fixed to the pivoting piece of the adjacent pivoting lever interconnected thereto. The controller measures the position of the individual pivoting levers and the pressure in the individual pneumatic muscles, calculates the externally acting forces from the pressure-distance diagrams for the individual pneumatic muscles and the geometric lever mechanical ratios for all pivoting levers and limits said forces.

28 Claims, 4 Drawing Sheets

U.S. PATENT DOCUMENTS

| | | |
|---|---|---|
| 2001/0014781 A1 | 8/2001 | Nissim |
| 2003/0223844 A1 | 12/2003 | Schiele et al. |
| 2004/0267331 A1 | 12/2004 | Koeneman et al. |
| 2007/0299371 A1 * | 12/2007 | Einav et al. ................ 601/5 |

FOREIGN PATENT DOCUMENTS

| | | |
|---|---|---|
| DE | 19524666 C1 | 7/1995 |
| DE | 29922651 UI | 3/2000 |
| DE | 10139807 A1 | 3/2003 |
| EP | 1609451 A1 | 12/2005 |
| GB | 1331756 | 9/1973 |
| WO | WO03/080297 A1 | 10/2003 |
| WO | WO2004/096083 A2 | 11/2004 |
| WO | WO2006/061834 A2 | 6/2006 |
| WO | WO2006/092872 A1 | 9/2006 |

\* cited by examiner

ROBOT ARM

TECHNICAL FIELD

This application relates to a flexible robot arm driven by pneumatic muscles.

BACKGROUND OF THE INVENTION

DE 3630822 C2 (Bridgestone) describes an arm pivotable about precisely one axis for an industrial robot. The arm is attached to a rotatably mounted belt pulley which is encompassed by a cable, a so-called pneumatic muscle being situated at both ends leading away from the belt pulley. A pneumatic muscle is made up of a tube-like center portion and two plate-like end pieces, at least one of which is provided with an air passage. When the tube-like center portion is inflated, its circumference is expanded and its length is reduced. This reduction in length can result from overcoming an external tensile force. When in the use case corresponding to DE 3630822 a pneumatic muscle is tightened, the arm is pivoted in a rotational direction; when this pneumatic muscle is released and the second pneumatic muscle is tightened, the arm is pivoted in the opposite direction. The arm is "touch-capable" in the sense that when an external force is applied, it yields elastically on its own accord with a soft characteristic, it being possible to infer the magnitude of the external force using position sensors and taking into consideration the pressure present in the pneumatic muscles. The described arm for industrial robots has not gained acceptance. Since the elastic yield is uncontrolled in this case, preference has been given to stiffer drive principles using, for example, electric motors or hydraulic cylinders and, if necessary, a "soft grip" has been implemented using separate gripping pieces.

U.S. Pat. No. 4,984,568 describes a robot arm used for back massage driven by a plurality of reciprocally pivotable hydraulic cylinders. It is affixed to the side frame piece of a bed frame, projects over the surface of the bed, and exerts pressure on the back of a person lying in a prone position on the bed. The robot arm can be controlled by the person lying on the bed by using a control unit. Massage robots of this type have a number of disadvantages. Hydraulic systems are costly, heavy, often disseminate an odor of hydraulic oil, and entail the risk of contamination by escaping hydraulic fluid. They are also dangerous as massage robots because an error in the hydraulic system can very rapidly cause dangerously high forces to be applied to the person being treated.

DE 195 24 666 C1 describes a massage robot which is also mounted on the side of a bed. The tool holder which is movable in three spatial coordinates via linear drives can hold various massage devices and thus act upon the person to be massaged. A number of programs are available for the controller. The action on the person is force-regulated. Pneumatic cylinders or electric motors are provided for the drives. To rule out dangers for the person to be massaged in the event of errors in the controller, predetermined breaking points are provided in the system which break if allowable forces are exceeded.

Massage robots of a very similar design are also described in U.S. Pat. No. 5,083,552 and US 2001/0014781 A1. When controlled suitably, these massage robots can provide an excellent massage. However, all of them have a very high purchase price, require a large amount of space, and have a menacing appearance. In addition, they are very prone to damage with regard to a number of forces which can occur when moved by persons in connection with the massage due to linear guides arranged in a cascade-like manner.

DE 101 39 807 A1 describes a robot arm for industrial applications built up from a plurality of interlinked pivotable levers. The joint between two levers is designed in a manner which is of particular advantage. The drive elements for the individual levers are electronically, hydraulically, or pneumatically operated lifting rod units situated directly on the levers. It is disadvantageous that these drive elements are relatively heavy, space-consuming, and costly.

BR 9303695 A describes a robot arm built up from a plurality of pivotable levers interlinked with one another, each of the pivoted levers being made up of a pivotable piece based on a support and two pneumatic muscles, the base and pivotable piece of one pivoted lever being affixed to opposite ends of the support, the pivotable piece being rotatably supported in relation to the support on an axis lying normally to it, the two pneumatic muscles extending between the base and the pivotable piece and engaging the pivotable piece on different sides of the pivot axis and the pivotable piece of a lever being rigidly connected to the base of the second lever. Despite the simple and robust structure, this design has so far not gained acceptance, presumably because an excessively large source of inaccuracies and hazards is seen in the somewhat difficult activation of the pneumatic muscle.

WO 2003080297 A1 describes the reproduction of a human hand and a human arm using interlinked, reciprocally pivotable pieces whose motion relative to one another is driven by pneumatic muscles, which act on the individual parts to be moved via cables whose function is similar to those of human tendons. The advantage of pneumatic muscles is seen in that they require less space compared with other driving means. However, the design according to WO 2003080297 A1 is nonetheless so complex that it inevitably results in excessively high costs and thus can hardly be used in an appreciable scope.

U.S. Pat. No. 5,417,643 and DE 299 22 651 U1 describe a chair equipped with a multi-element arm rest designed as a therapy device for the passive mobilization of persons. The individual elements are attached so as to be movably guided in relation to one another. Controllable drives operate between the individual elements. The patient sitting down on the chair places one arm on the armrest. According to a control program, the armrest is then moved and the patient's arm with it. There is no mention in the DE publication of what happens if the controlled movements of the armrest vary from the patient's possibilities for movement and thus could cause pain or even injury to the patient. According to the U.S. publication, a rapid cut-off is provided for this case. A disadvantage in this is that already dangerously high forces may have impacted the patient when this cut-off takes effect and the treatment is thus stopped.

According to EP 1 609 451 A1, a device for passive physical therapy is described which is made up of rigid, shell-like parts which are worn by the patient that are similar to pieces of a knight's armor and are connected to one another by joints. Pneumatic muscles act as controllable actuators between individual shell pieces moved in relation to one another. Nothing is said concerning the type of activation of the actuators. The design made up of shell-like pieces makes the device rather heavy and the process of putting it on and taking it off is somewhat laborious.

US 2003/0223844 A1 also describes a device made up of a plurality of rigid, shell-like elements worn by a person that are similar to the pieces of a knight's armor and are connected with one another by joints. The device is used for controlling a remote robot situated in space, for example. Elastically pretensioned Bowden cables assist in lifting individual elements against the force of gravity and are also used to measure the position of individual elements in relation to one another. As a function of the measuring result, a remote robot is moved. In an advantageous refinement, controlled forces are also exerted between the individual shells of the device as a function of forces acting on the robot.

Accordingly, it would be desirable to provide a robot arm which may be used in a large number of private households, in industry, and in medical technology. For reasons of cost, robustness, weight, and space, a design corresponding to BR 9303695 having pneumatic muscles as drive elements may be considered. In contrast, primarily the safety may be increased so that the robot arm does not damage anything by high forces or shocks at high speed and no one is injured, and the robot arm may be more simple to operate and usable for a larger number of different applications. In particular, the robot arm may also be usable as a therapy device for the passive and active mobilization of human limbs.

SUMMARY OF THE INVENTION

According to the system described herein, a robot arm may include the following features. The robot arm may include at least one pivotable lever. In an embodiment, the robot arm may be made up of at least two interlinked pivoted levers. Each pivoted lever has a constant length and is made up of a support, to one end of which a base is rigidly connected, and a pivotable piece is situated at its other end. The base of the second pivoted lever is rigidly connected to the pivotable piece of the first pivoted lever. The base of the next pivoted lever is rigidly connected to the pivotable piece of the previous pivoted lever. Pneumatic muscles are positioned between the base and the pivotable piece of one pivoted lever which may be used to actively set the particular pivot position. The force which the robot arm exerts externally is detected and limited by the controller of the robot arm. This detection and limitation is performed not only for the end of the robot arm, where a tool may be positioned, but also for all pivoted levers lying between the point of attachment of the arm and the end. A tool holder is situated on the pivotable piece of the last pivoted lever, on which different tools may be positioned and/or one or two pivoted levers of the robot arm may offer a contact surface for the lower arm and upper arm or other limbs of a person to be treated by positioning them roughly parallel to these limbs. The force that the robot arm is able to exert may also be mechanically limited, for example, by limiting the gas pressure in the pneumatic muscles in an upward direction, preferably using pressure relief valves. The speeds at which the parts of the robot arm may be moved is limited by the controller and/or by closed loop control by passive damping elements. Movements that the robot arm is intended to perform independently may be programmed using a teach-in procedure. In the case of at least one of the pivoted levers, the pivotable piece may pivot relative to the base about two non-parallel axes.

BRIEF DESCRIPTION OF THE DRAWINGS

Embodiments of the system described herein showing advantageous details of the mechanical structure and advantageous properties to be provided for the control of the robot arm are described with reference to the drawings that are briefly described as follows.

DETAILED DESCRIPTION OF VARIOUS EMBODIMENTS

An embodiment of a robot arm according to the system described herein for the movement of a tool—as sketched in FIG. 1 and FIG. 2—will first be described in greater detail below. The embodiment of a robot arm according to the system described herein as a therapy device for passive and active mobilization of limbs will be described in greater detail further below.

Base 1.1 of first pivoted lever 1 supports the entire robot arm. It may stand on the floor of a room directly or on locking castors. However, it may also be attached to a bracket on a wall, to a machine, or to a fixture. It may also be situated on a platform which is moved controllably in the room or is mechanically pivotable about a vertical axis in relation to another base standing fixedly in the room. From base 1.1, support 1.2 rigidly joined to it projects upward and ends in ball 1.2.1 of a ball-and-socket joint. The socket of this ball-and-socket joint forms pivotable piece 1.4 of first pivoted lever 1. Three pneumatic muscles 1.3 aligned parallel to support 1.2 are situated between base 1.1 and pivotable piece 1.4. Their points of attachment on pivotable piece 1.4 form the corners of a triangle, in the center of which is situated ball 1.2.1. Shortening one or two pneumatic muscles 1.3 and extending the two other pneumatic muscles or the third pneumatic muscle causes pivotable piece 1.4 to pivot on the center point of ball 1.2.1 about all the axes which pass through the center point of ball 1.2.1 and lie normally to the orientation of the pneumatic muscles. Since each of the pivoting movements thus possible may be considered to be combined from pivoting movements about exactly two axes, this means that in the manner of description customary for robot arms, pivotable piece 1.4 is pivotable about two axes. A stop prevents pivotable piece 1.4 from performing a pivoting movement about a third axis, namely the one lying parallel to the pneumatic muscles. This stop is formed by a pin 1.4.1 rigidly joined to pivotable piece 1.4 which protrudes into a groove on the surface of ball 1.2.1. This groove on the surface of ball 1.2.1 lies in a plane of symmetry of the ball lying parallel to the orientation of pneumatic muscles 1.3. A rotational movement about this third axis could not be adequately controlled by pneumatic muscles 1.3 which are in parallel alignment and is therefore entirely avoided by the described stop. In the longitudinal axis of pivoted lever 1, the ball has a bore as a cable and hose passage.

Instead of the described ball-and-socket joint, it would also be possible to use a universal joint, two axle bolts being used instead of a ball. A first axle bolt is normally aligned with the support. The second axle bolt is normally aligned with the first axle bolt and is supported so as to pivot about its axis. The pivotable piece is affixed to the second axle bolt so as to pivot about its axis. The universal joint may also have a cable passage.

Base 2.1 of second pivoted lever 2 is rigidly joined to pivotable piece 1.4 of first pivoted lever 1 via intermediate pieces 1.4.2 and 2.1.1. Intermediate pieces 1.4.2 and 2.1.1 may be mounted adjacent to one another in a plurality of different positions, making it possible to adjust the angular position between pivotable piece 1.4 of first pivoted lever 1 and base 2.1 of second pivoted lever 2 and accordingly the optimal starting position of the two pivoted levers for the particular application.

If pivotable piece 2.4 of second pivoted lever 2 needs to be rotatable about only one axis in relation to base 2.1, it may be supported on a cylindrical axle bolt aligned normally with support 2.2 of that pivoted lever instead of on a ball as described earlier. In this case, only two pneumatic muscles are used.

Third pivoted lever 3 is designed in essentially the same manner as first pivoted lever 1. Its pivotable piece 3.4 is thus pivotable about two axes in relation to base 3.1.

Base 3.1 of the third pivoted lever is directly connected to pivotable piece 2.4 of the second pivoted lever.

Figure 1:
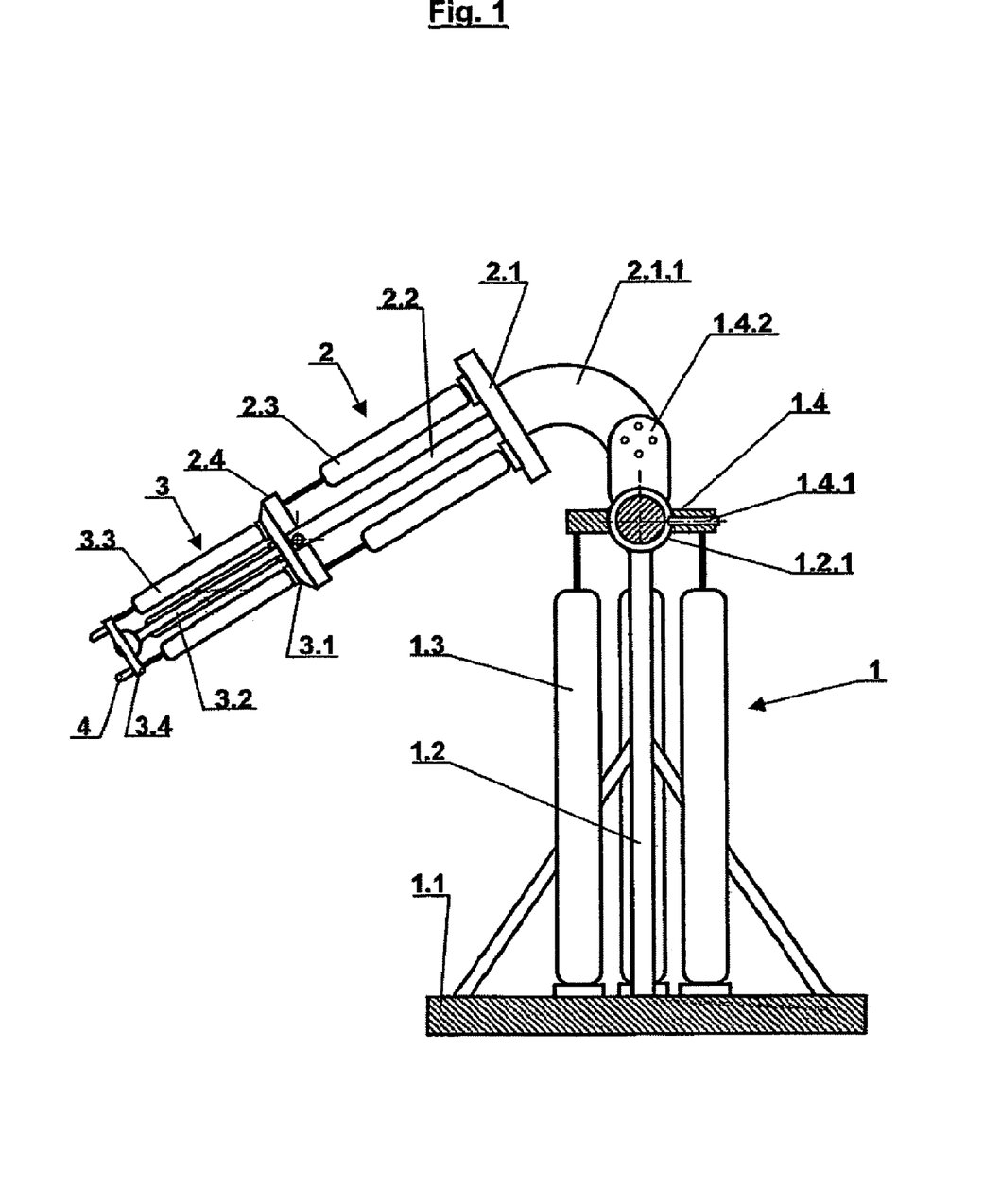
FIG. 1: is a basic representation of an exemplary robot arm designed according to an embodiment of the system described herein having three pivoted levers and one tool holder in side view. Individual details are shown in sectional view.
Figure 2:
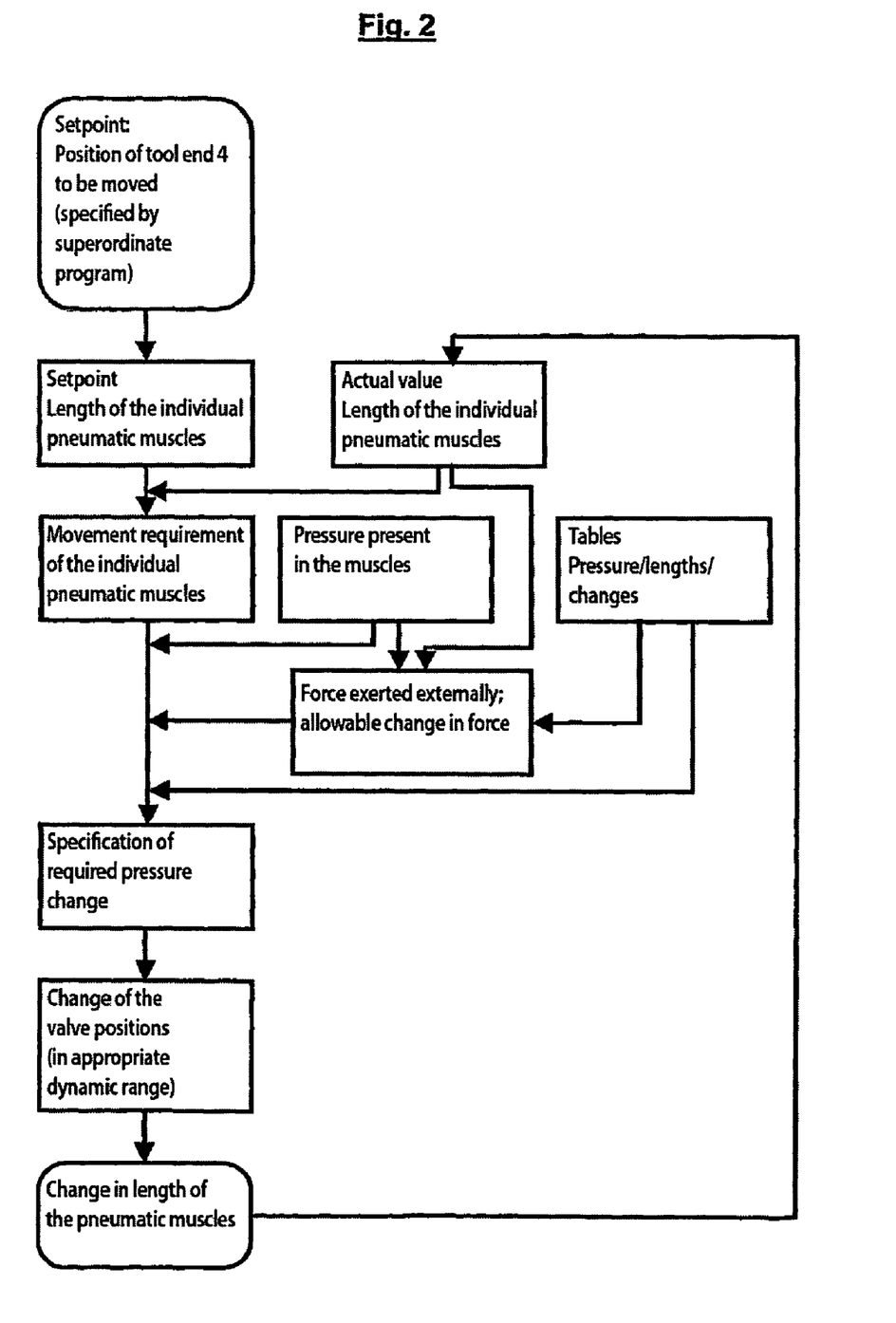
FIG. 2: shows a possible sequence of information processing for adapting the actual position of the tool holder to be moved in the embodiment according to FIG. 1 to a setpoint position. Interim results of information processing are shown in the individual fields. The lines provided with arrow points indicate the reception of data from sensors, or calculation operations.

In the example according to FIG. 1, pivotable piece 3.4 of the third pivoted lever is furnished with a tool end 4, optimally in the form of a lockable plug and socket device for various tools. Tools in this sense may be various electrically or pneumatically controllable grippers or even rigid objects such as plug and socket devices, hooks, levers, scoops, crowbars, wrenches, etc. The grippers in turn may hold tools such as various massage appliances, cleaning rags, normal hand tools, telephone receivers, cutlery, etc.

As an adaptation to the expected torque loads, pivoted lever 1 should be designed to be stronger than pivoted lever 2, and pivoted lever 2 stronger than pivoted lever 3. Accordingly, pivoted lever 1 is also the heaviest and pivoted lever 3 the lightest. Compared to a different weight distribution, this also brings the advantage that higher acceleration of tool end 4 is possible if desired and the impact of a possible collision of the tool end with an obstacle will be less severe.

The described sequence "biaxial joint—lever of constant length—uniaxial joint—lever of constant length—biaxial joint" corresponds roughly to the sequence "shoulder joint—upper arm—elbow joint—lower arm—hand joint" of the human arm. For that reason, the possibilities for movement of the robot arm designed in this manner will be very well understood rapidly and intuitively by the persons using it, thereby making it possible for it to be used optimally without long familiarization time. Thus, the described interlinking of pivoted levers whose length per se cannot be changed, including biaxial and uniaxial joints lying between them, makes an extremely good compromise between the multitude of movement possibilities of the tool end on the one hand and low costs on the other.

Compared to actuators such as fluid-driven cylinders or electric motors, pneumatic muscles have the disadvantage that they are able to exert targeted controllable force in only one direction and that only a significantly reduced positioning accuracy is thus achievable at roughly the same expense. Primarily due to the second of these disadvantages, the advantages of pneumatic muscles for robot applications have been far from being adequately recognized and they are therefore hardly used.

In particular in the case of applications for robot arms used for the personal needs of persons and intended to carry out simple tasks, the positioning accuracy that can be achieved with pneumatic muscles is entirely adequate. Tasks to be considered include, for example: guiding massage appliances, holding telephone receivers, guiding a vacuum cleaner, cleaning windows, polishing, painting, holding objects such as tool racks in a predetermined position, etc. In applications of this type, the relatively poor positioning accuracy of pneumatic muscles is no disadvantage at all. On the contrary, compliance represents the greatest advantage in activities with surface contact due to the fact that it is not the position but instead the contact pressure which is significant here.

The use of pneumatic muscles as an actuator for robot arms offers a large number of important advantages:

Soft Touch
Because movement of the robot arm is caused by the volume-elastic medium air, the force-displacement characteristic is flexible and the action on an external object is unable to change abruptly from a small force to a large force.

Extreme Robustness (Passive Safety, Self-Protection)
In contrast to the widespread industrial robots having electric motors and rigid motions, the flexible pneumatic muscles are able to absorb and dampen impacts on the robot itself. Despite its light construction, this makes the robot extremely robust toward peak loads and vibrations. Compared with piston-cylinder actuators, the pneumatic muscles themselves are also very robust, as they do not have surfaces on which parts slide on one another and seal and their flexibility as a tube makes it practically impossible for them to be damaged by collision with objects.

Force-Controlled Movement (Active Safety, Protection of Others)
Measuring the position of the individual pivoted levers and the pressure present in the individual pneumatic muscles makes it possible for a control unit to calculate the external force at tool end 4, while taking into account the pressure-displacement diagram of the individual pneumatic muscles and the prevailing lever ratios. This means that it is possible to determine the externally acting force without the necessity of additional force sensors. The controller makes it possible to specify the maximum force against an external resistance which may be applied by pressure against the movement to be carried out. It is possible to regulate this maximum force relatively well and reliably, since the deformation characteristic of the robot arm is "flexible" and thus minor movement disorders imposed from outside do not result in abrupt changes of the forces in the robot arm. This also makes it readily possible to have the robot arm follow an object while applying pressure to this object if this object moves within specific limits. Since the individual parts of the robot arm are light, they do not represent a danger of collision with persons as long as they are not too fast.

Measurement of the exerted muscular force, e.g., using strain gauges in the linear function line of the force makes another increase in precision possible.

Safety (Passive Safety in the Event of a Malfunction)
Even without providing predetermined breaking points in the robot arm, it is possible to ensure that no dangerously high forces will be exerted on persons located in its area even in the event of incorrect control due to the fact that the pressure in the pneumatic muscles is, for example, limited by pressure relief valves or the speed is limited by passive damping elements. Such damping elements may be produced, for example, by providing constrictions in the area of the lines in which the gas flows into or away from the pneumatic muscles or by limiting the gas flow. Similarly, additional damping elements such as, for example, piston-cylinder systems in which a fluid is pumped through a narrowed area in the event of movement, may be positioned between pivoted levers moving relative to one another. Similarly, it is conceivable to use brake systems between the relative pivoting movements of the pivoted levers, which function according to the principle of centrifugal brakes, according to which friction is generated between two parts moving relative to one another as a result of their being pressed against one another due to centrifugal force.

Economical

The simple design makes pneumatic muscles more economical than hydraulic or pneumatic cylinders, or comparable usable electric drives.

Lightness

Pneumatic muscles have a significantly lower weight than comparable actuators of similar action presently in production.

In the normal case, the pneumatic muscles are connected directly to the base of the pivoted lever or in the most direct path of connection through rigid tension members such as a steel cable, a chain, a belt, or a connecting rod. The pneumatic muscles should establish a direct path to the particular pivotable piece of the pivoted lever in question exclusively through tension members such as, for example, cables which are attached on the one hand to the pneumatic muscle and on the other hand to the base or the pivotable piece of a pivoted lever. All other possible transfer mechanisms such as pivoting levers, toothed wheels, deflection rollers, etc., entail not only additional purchase expense but are usually also sensitive to damage due to improper handling or little maintenance. Not least, parts of this type are also dangerous for persons who may come into contact with them and require safe covers—which again entail expense and are subject to damage.

The combination of pneumatic muscles with the described sequence of, for example, three pivoted levers also achieves robustness and safety due to the fact that the robot arm is able to yield to severe loading from nearly any direction by rotation in the joints as prescribed and by extension of the pneumatic muscles. This design makes it readily possible to construct a robot arm which is on the one hand able to grasp so sensitively that it is able to catch hold of and pick individual grapes from a vine and on the other hand is able to hold a steel object such as a chisel which is struck by a heavy hammer without the robot arm being damaged as a result.

Because the length of the individual pivoted levers of the robot arm cannot be changed, the necessary lines for compressed air supply, sensor signals, and electricity for any electrical tools held on the tool end may be easily attached to the base and pivotable pieces. With a low reserve of length between the individual joints, they are only pivoted somewhat when the robot arm moves but not moved in addition in a linear direction. In a version of the line guidance which is elegant in particular, the lines are routed in the joints through bores in the joint ball or in joint bolts.

The possibilities for activation are of very great significance for the practical use of the robot arm as they are for every robot arm. Examples of desirable and entirely feasible designs for practical use by non-professional users in the design described include:

Prepared displacement-time-force profiles.

Teach-in, i.e., programming of a movement to be carried out by the robot arm at a later time by one-time manual control of the arm movement, with simultaneous recording of the movement.

Teach-in, i.e., programming of a movement to be carried out by the robot arm at a later time by one-time specification of the arm movement using a visually recognizable marker, with simultaneous recording of the movement. During the recording, the robot arm may be at rest, since the marker may be held and moved by a person. Compared with other programming methods and also other teach-in methods, this method is relatively imprecise. However, in combination with applications in which a preprogrammed movement is followed in a force-regulated manner, the precision is entirely adequate.

Teach-in due to the robot arm being grasped by the programmer at any point in the corresponding mode and moved manually in the desired sequence to be run through later.

Editability of programmed movements with respect to geometric changes, speed changes, changes with regard to the forces to be applied.

Adjustability of safety-relevant limits such as maximum speed, maximum acceleration, maximum forces.

Adjustability of extensive position tolerance at constant contact force as long as the arm is in contact with the target object. The arm thus "follows" the object in a force-controlled manner even if the object itself moves—within certain limits.

Regulation to the effect that the adjusted position of the robot arm is restarted automatically if the robot arm is moved from this position as the result of an external action such as, for example, an impact to one of its movable parts.

Because the pneumatic muscles strongly dampen vibrations applied externally, the robot arm may also be used to advantage in or on devices that vibrate. For example, a robot arm according to the system described herein may also be used in an automobile.

Primarily for the teach-in in which the robot arm is guided by hand and for the force regulation on contact, the described design of the robot is very advantageous, since the robot arm is very light, hardly any friction opposes a movement, and the flexible movement characteristic strongly simplifies the tracing of a contour.

The described combination of features of a robot arm results in a bundle of advantages that has previously been unattained: economy, robustness, flexibility with regard to possible applications, harmlessness, safety, and intuitive understanding of the possible movements. For the first time, due to increasing sales figures, practically useful robot arms are thus made possible that may be used for smaller simple industrial operations and may also be reasonably purchased for private households.

The use of the robot arm according to the system described herein for passive and active physical therapy of a patient, a contact surface for a patient's body part to be moved being attached to at least one of these pivoted levers, and movements of the contact surface being preprogrammable in a control unit in connection with the pivoted levers, makes it possible to achieve the following improvements compared to other devices used for this purpose:

The robot arm is able to react softly to deviations from the setpoint trajectory, i.e., from the desired displacement-time curve, as a result of the patient's reactions, so that the patient is by no means injured.

The robot arm is able to register and record deviations from the setpoint trajectory resulting from the patient's reactions. It is thus possible to improve the documentation and assessment of the therapy outcome and accordingly better adapt the therapy.

In the typical application for the therapy of an arm of a seated person, a device is described which is made up of a plurality of interlinked, mutually controllable pivoted levers and may be positioned on the side of a chair on which the person to be treated is sitting. One or two pivoted levers of the device offer a contact surface for the underarm and upper arm, legs, or additional limbs of the person to be treated by being positioned under these limbs and roughly parallel to them. In the case of the pneumatic muscles used as positioning members between the individual levers of the device, the detection of the lengths of the pneumatic muscles and the pressure in the pneumatic muscles is in any case necessary for activating the pneumatic muscles. This detection is also used for detecting the trajectories actually followed. The adjustment of a very soft reaction of the device to deviations from the setpoint trajectory in the elastic range may be made by a corresponding adjustment of the regulation necessary in any case for the controlled operation of the pneumatic muscles.

In the simplest embodiment, the robot arm which may be used for this purpose has only a single pivoted lever. It may be used, for example, for the mobilization of a shoulder joint.

As pneumatic muscles have no static friction, it is possible to avoid jerking even in small, slow movements; force-controlled movement is also possible with the smallest forces. Because the change in length of the pneumatic muscles is due to pressure of the volume-elastic medium air, the force-displacement characteristic is already inherently flexible. Therefore, pneumatic muscles make it substantially easier to implement an elastic behavior to deviations from the setpoint trajectory than is the case with customary positioning members such as hydraulic cylinders or electric motors. In contrast to pneumatic cylinders, pneumatic muscles do not have a breakaway force after shutdown; thus even in the case of the slightest engaging forces, an elastic yield occurs without jerking. An additional gain in safety results from the fact that the force exerted by pneumatic muscles on an external object cannot be abruptly increased due to physical factors.

Figure 3:
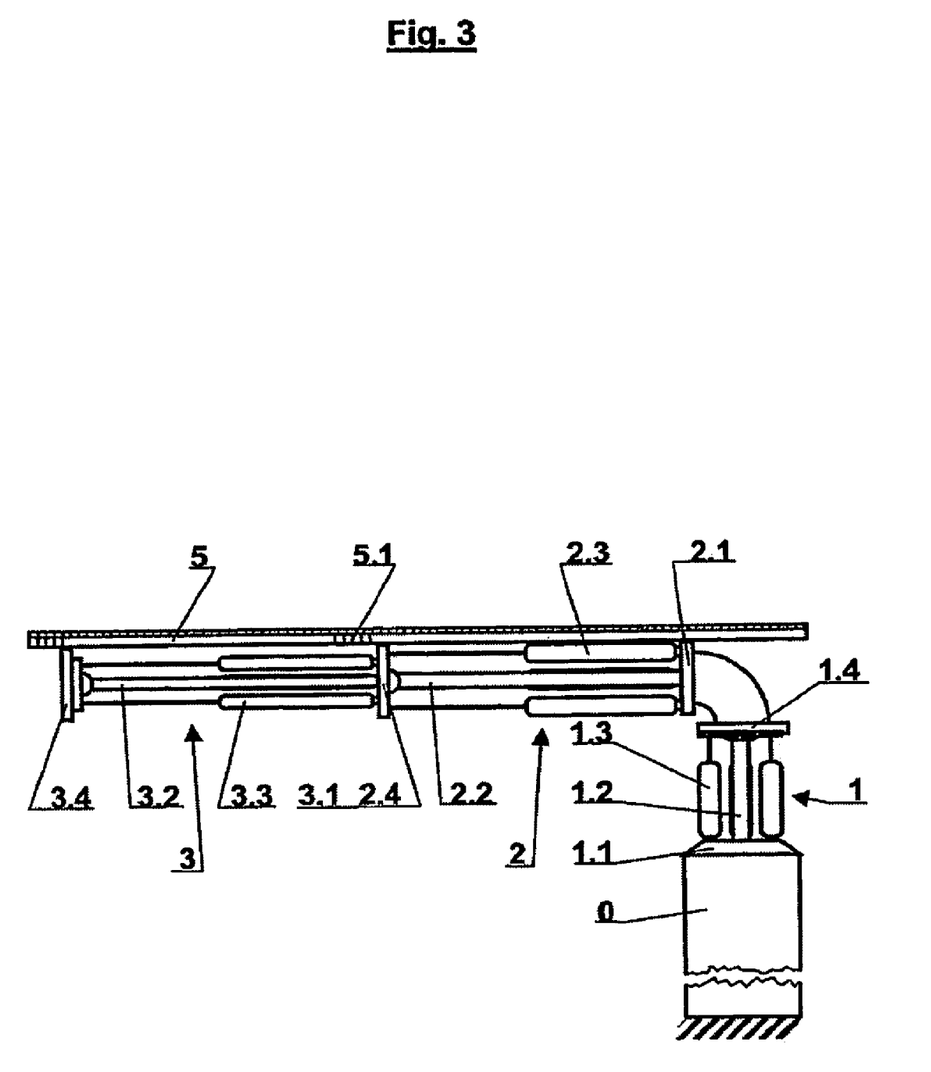
FIG. 3: is a basic representation of an exemplary robot arm designed according to an embodiment of the system described herein having three pivoted levers and a contact surface for the arm of a person, for example, in side view.

In addition to base 0 and contact surface 5 provided with flexible elements 5.1 for the limb to be moved of the person to be treated, the exemplary robot arm according to the present invention sketched in FIG. 3 is made up of three interlinked pivotable levers 1, 2, 3. One side of first pivotable lever 1 is held immovable via base 1 in relation to the chair or the bed on which the person to be treated is located. Each pivotable lever has a constant length and is made up of a support 1.2, 2.2, 3.2, to one end of which a base 1.1, 2.1, 3.1 is rigidly connected, and a pivotable piece 1.4, 2.4, 3.4 is situated at its other end. The base of the third pivotable lever is rigidly connected to the pivotable piece of the second pivotable lever. The base of the second pivotable lever is rigidly connected to the pivotable piece of the first pivotable lever. Pneumatic muscles 1.3, 2.3, 3.3 are positioned between the base and the pivotable piece of a pivotable lever which may be used to actively set the particular pivot position. Contact surface 5 extends over the longitudinal direction of the pivotable levers and is connected to them. The pivotable piece of the individual pivotable levers is affixed to the associated support via, for example, a ball-and-socket joint, a universal joint, or even only a bolt-cylinder joint. Thus a movement about one of a plurality of non-parallel situated axes may be produced as needed. The pneumatic muscles of a pivoted lever are aligned parallel to the support and are positioned on various sides of the particular joint axes. Contracting one pneumatic muscle and extending the other pneumatic muscle or muscles of a pivotable lever cause the pivotable piece of this pivotable lever to be rotated actively about the particular axis or axes. In simplified embodiments, it is also sufficient to use a single active pivoted lever. Additional passive pivoted levers may be adjoined.

In designing the individual pivotable levers and the connecting pieces between them, it is possible to imitate approximately the individual parts of a human arm with respect to length and degrees of freedom of movement. However, it is also possible to provide a shorter or longer interlinking of a plurality of even longer pivotable levers and make substantially greater movement latitude possible with respect to the mechanical design. This makes the device more usable for persons of different sizes and a larger range of possible movements. In particular the use of shorter interlinks of pivotable levers is entirely sufficient when the pivotable piece pivots about only a single axis with respect to the base. This makes it possible to avoid costs and gain robustness.

In order to keep the forces of mass inertia as low as possible during operation, by adapting to the torque loads to be expected, the pivoted levers should be designed to be continuously thinner and weaker in the sequence away from base 0 and thus lighter per unit of length.

Figure 4:
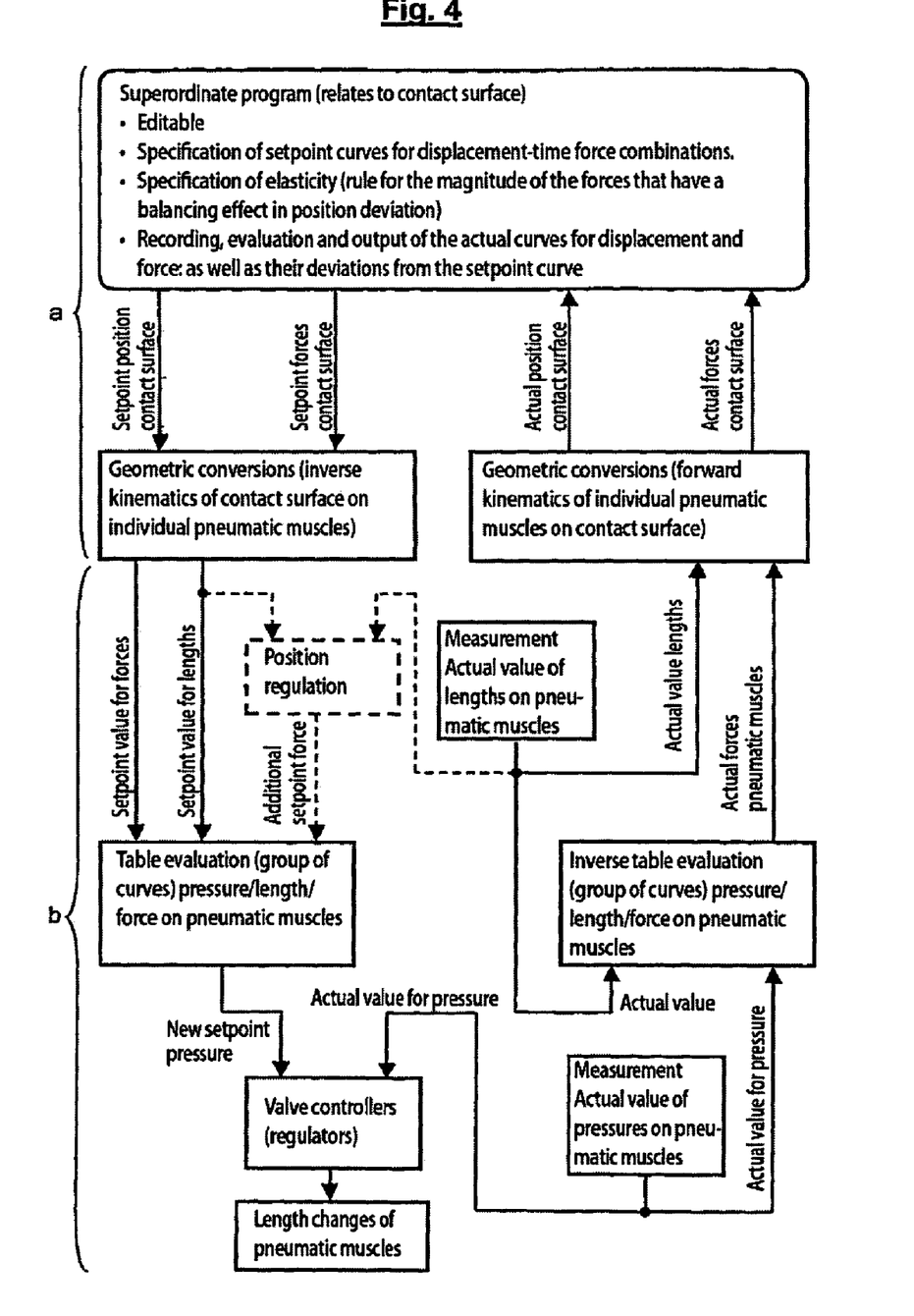
FIG. 4: shows a possible information processing and control sequence of the device of FIG. 3.

In the flow chart of FIG. 4, the text passages in the boxes signify operations. The lines provided with arrow points in between identify either only the sequence of operations or they also signify information on the result of an operation which flows into the next operation.

The operations in the area of curved bracket b relate to the normal mode of operation of controlled pneumatic muscles. The actual length is supplied to a setpoint value for the length of the individual pneumatic muscles while taking into account the actually measured lengths and the actually measured pressures using computer-stored tables or groups of curves by correspondingly changing the pressure in the individual pneumatic muscles in a regulated manner.

The operations in the area of curved bracket a relate to data processing steps that may be performed in a simple data processing system. On the one hand, they relate to the superordinate program and on the other hand to the bidirectional conversion between the lengths of individual pneumatic muscles 1.3, 2.3, 3.3 and the position data of contact surface 5 as well as between the forces at the individual pneumatic muscles and the forces on the contact surface.

The superordinate program specifies which displacement-time curves are to pass through the contact surface, and the manner in which external forces are to react to the contact surfaces is also specified. This reaction may, for example, be a more or less softly adjusted elastic response, i.e., a response in which the reaction force having a resetting effect is proportional to the deflection from the setpoint position. However, an adjustment may also be made so that, for example, the reaction force has a constant—low—value independent of the deflection. Of course, combinations of this, for example, "elastic response only up to a specific (low) maximum force", are feasible and also often practical, as well as any other adjustments due to corresponding program adjustments.

For example, a reaction force in the event of a deviation from the specified displacement-time curve of the contact surface may be entirely omitted for training of the coordination capability. Instead of this, the setpoint curve of the displacement over time as well as deviations may be reported through visual and/or acoustic signals. Information is obtained concerning the coordination capability through the measurement and, for example, the integration of the deviations over time.

In various embodiments, not only are the actual displacement-time curves included in the measurement but also that it is possible to record and evaluate their deviations from the setpoint curve. From this it is possible to infer significant information concerning the course of therapy and the further design of the therapy.

Of course, many safety-relevant limits may be provided in the superordinate program. For example, the program routine may be used to automatically prevent physiologically impossible positions from being started at all. Acceleration, speed, and force limits may be built in. Using the evaluations of the deviations of the actual displacement-time curves, it is possible to assess if a patient is becoming increasingly tense or relaxed, or if he is becoming too fatigued; accordingly, the further course may be coordinated or the treatment may be interrupted or entirely stopped.

Instead of displacement-time curves, it is of course also possible to preprogram force-time curves while complying with specific speed and position limitations.

In the embodiment of the robot arm according to the system described herein for passive and active physical therapy, the use of controlled pneumatic muscles as actuators already provides the essential information and controlling means in any case. Furthermore, for the advantageous use as a therapy device, only a relatively simply programmable data processing unit may be included in the data processing area. This data processing unit may, for example, be implemented in the form of a common portable computer having low computing power compared to customary workstation computers.

The data processing system may of course be programmed in such a way that it is possible to enter the setpoint displacement-time curves by keyboard using an input mask. As it is in any case designed for recording the actual displacement-time curves during operation, it is only a small added step to use curves recorded in this manner as new setpoint curves. This means that it is possible to program the system simply using a teach-in method by grasping the contact surface in the corresponding mode and manually moving it in the desired sequence which is later to be run through automatically.

In practical use, this means that the path that the robot arm is to follow automatically at a later time may be programmed in such a way that the patient places his arm on the contact surface and the therapist carefully moves the contact surface together with the arm in a way that he considers to be correct.

If appropriately skilled, the patient can of course personally program a path in this manner by moving the contact surface appropriately when the robot arm is switched to recording mode.

In an advantageous therapy form which is simple to implement in this manner, a movement range is specified which the contact surface is finally expected to be able to follow together with the patient's arm but is not able to follow initially. The robot arm attempts to follow the predetermined path. Due to, for example, fear of pain, immovable joints, absence of coordination, or absence of muscular force, the patient forces a less demanding path. This forcing is pain-free for the patient, since the robot arm reacts very compliantly to the deflections caused by the patient. The robot arm "notices" this second path and follows this path several times so that the patient relaxes with this possible movement. Gradually the robot arm "attempts" to bring the path to be followed again into line with the original setpoint path. To that end, the position deviations of the individual setpoint paths from the original setpoint path in the particular time phases in the individual passes are adjusted increasingly less frequently.

Additional key words for programming the superordinate controlling data processing system for the use of the robot arm according to the invention as a device for passive and active physical therapy are:
Prepared displacement-time-force profiles.
Editability of programmed movements with respect to geometric changes, speed changes, changes with regard to the forces to be applied.
Adjustability of safety-relevant limits such as maximum speed, maximum acceleration, maximum forces.
Adjustability of extensive position tolerance at constant contact force as long as the contact surface is in contact with the target object. The contact surface thus "follows" the object in a force-controlled manner even if the object itself moves—within certain limits.
Regulation to the effect that the adjusted position of the robot arm is restarted automatically if it is moved from this position as the result of an external action such as, for example, an impact to one of its movable parts.

All of these functions may be easily produced using the described design by programming work normally performed by those skilled in the art; therefore, this is not described in greater detail here. The inventor's merit resides in having recognized that such functions may be very valuable for therapy and that they may be implemented simply, economically, and safely using the design according to the system described herein.

Additional advantages obtained by using controlled pneumatic muscles as actuators for a robot arm for passive and active physical therapy are:
Extreme Robustness
Compared with robot arms driven by other means, the flexible pneumatic muscles are able to absorb and dampen impacts to the arm itself. Despite its light construction, this makes the robot arm extremely robust to peak loads and vibrations. Compared with piston-cylinder actuators, the pneumatic muscles themselves are also very robust, as they do not have surfaces on which parts slide on one another and seal and their flexibility as a tube makes it practically impossible for them to be damaged by collision with objects.

This extreme robustness makes it possible, with simple adaptations, to use the robot arm according to the system described herein as an underwater therapy device, i.e., as a therapy device which, for example, moves the legs of a patient under water in periodic cycles corresponding to an adjustable trajectory. Such an adaptation may be that the part of the robot arm projecting under the surface of the water is surrounded by a stocking-like tube made from a waterproof, flexible thin material which is closed on one end. If such a tube is used, the individual parts of the robot arm are thus directly washed around by water—which is no problem if the material is properly selected—the characteristics of the individual pneumatic muscles with regard to fluid pressure and force given off with regard to pressure must be shifted compared to systems in air to account for the additional effect of pressure as a consequence of the weight of the water. In order to avoid disturbance by bubbles, air outlet lines from the pneumatic muscles should be routed above the surface of the water.

Safety
Dangers for persons may be advantageously avoided even in the case that the device's controller malfunctions. For this purpose it is only necessary to limit the pressure in the pneumatic muscles, for example through pressure relief valves or by an additional control unit operating independent of the central control unit. In other designs, predetermined breaking points would be necessary for this purpose.

Similarly, as already described further above for the use of a robot arm according to the present invention as a tool holder, the relative speed between individual parts of the robot arm which are movable relative to one another may be limited independent of the computer control by passive, directly mechanically acting damping elements such as constrictions in the gas lines, centrifugal brakes, or additional shock absorbers actuated by a pressure medium.

Economical

The simple design makes pneumatic muscles more economical than hydraulic or pneumatic cylinders, or comparable usable electric drives. Besides the control elements used for activation on a standard basis, no additional special control elements are necessary for the device according to the present system described herein in addition to the central data processing system.

Lightness

Pneumatic muscles have a significantly lower weight than comparable actuators of similar action presently in production. In addition to the gain in mobility, a safety gain is also achieved, since the masses moved are lighter.

The described design results in a previously unachieved bundle of advantages for therapy devices for passive and active physical therapy: safety, economy, and value of the result. It may be expected that the design according to the system described herein will make effective therapy through passive and active physical therapy accessible to a significantly greater percentage of patients for whom it will be of potential benefit than is presently the case.

In order for the contact surface to exercise other than pure compressive forces on the patient, it should be furnished with removable means of fixation for the patient's limbs to be moved by it. These means of fixation may be, for example, belts with buckles or Velcro fasteners, or folding clasps.

The system described herein was explained here primarily for the purpose of passive and active physical therapy in the arm or shoulder area of seated persons to be treated. In principle, however, the system described herein is also suitable for passive and active therapeutic movement of other body parts such as, for example, the legs or the head in relation to the trunk, and the person to be treated need not necessarily be in a seated position but may for example be standing or lying on a bed.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A robot arm, comprising:
   at least one pivoted lever, the at least one pivoted lever comprising a support, a base, a pivotable piece, and a plurality of pneumatic muscles, the base being rigidly connected to a first end of the support, the pivotable piece being mounted on a second end of the support pivotably about one or two axes aligned divergent from the longitudinal direction of the support, wherein the pneumatic muscles extend from the base to the pivotable piece, individual pneumatic muscles engaging the pivotable piece at opposite sides of pivot axes of the pivotable piece; and
   a controller that measures a position of the at least one pivoted lever and a pressure applied to the individual pneumatic muscles, and calculates an externally acting force using pressure-displacement diagrams of the individual pneumatic muscles and geometric lever ratios for all pivoted levers provided with pneumatic muscles, and limits the externally acting force over time during a plurality of monitored passes of the robot arm through a movement range using profiles prepared for the plurality of monitored passes, wherein during a first monitored pass, the controller prepares a first profile of a first actual path of the at least one pivoted lever as affected by the externally acting force, wherein the controller establishes a reaction force in at least one of the plurality of pneumatic muscles that counteracts a deviation between the first actual path of the at least one pivoted lever and a pre-programmed setpoint path of the at least one pivoted lever, wherein the reaction force is applied during at least one second monitored pass after the first monitored pass, wherein, during the at least one second monitored pass, the controller prepares a second profile of a second actual path of the at least one pivoted lever as affected by the externally acting force and the reaction force, wherein the reaction force established for an subsequent monitored pass after the first monitored pass is dependent upon an amount of the deviation during a receding monitored pass.

2. The robot arm as recited in claim 1, wherein a force exerted by the at least one pivoted lever is limited by closed loop control.

3. The robot arm as recited in claim 2, wherein a gas pressure in pneumatic muscles is limited in an upward direction by pressure relief valves.

4. The robot arm as recited in claim 1, wherein a force exerted by the individual pneumatic muscles is measured more directly than via a pressure applied in the individual pneumatic muscles.

5. The robot arm as recited in claim 1, wherein the at least one pivoted level includes two or more individual pivoted levers, and wherein the relative speed between the individual pivoted levers is mechanically limited by passive damping elements.

6. The robot arm as recited in claim 1, wherein the dependency between the reaction force and the deviation includes at least one of:
   (i) a size of the reaction force is proportional to the deviation, wherein a proportionality factor is adjustable and an upper limit of the reaction force is adjustable; or
   (ii) a size of the reaction force is constant at an adjustable level if a minimum deviation is exceeded, otherwise, no reaction force.

7. The robot arm as recited in claim 1, wherein the controller is switched into a mode in which the movements of the robot arm caused by the robot arm being grasped at any location and moved by external forces are recorded and taken over in another step as a new preprogrammed setpoint movement.

8. The robot arm as recited in claim 1, wherein the controller is switched into a mode in which the position or the movement of an optical marker is detected by a camera and the trajectory to be followed is processed by a computer in order to be taken over in another step as a new preprogrammed setpoint movement of the robot arm.

9. The robot arm as recited in claim 1, wherein the position of the base of the at least one pivoted lever is mounted to a pivotable piece of another pivoted lever in various orientations.

10. The robot arm as recited in claim 1, wherein the at least one pivoted lever includes two or more pivoted levers, and wherein lines on joints between the two or more pivoted levers are routed through bores in a joint ball situated there or in a joint bolt situated there.

11. The robot arm as recited in claim 1, wherein a joint for a biaxial pivoting motion is a ball-and-socket joint, a groove running in the surface of the ball into which a bolt rigidly connected to the socket protrudes, the groove being situated in a symmetry plane parallel to the orientation of the pneumatic muscles which engage the socket.

12. The robot arm as recited in claim 1, further comprising:
a contact surface for limbs of a person to be treated, wherein the limbs are moved passively and actively by the robot arm.

13. The robot arm as recited in claim 12, wherein lengths and pressures in the individual pneumatic muscles are measured automatically, wherein forces applied in the individual pneumatic muscles are determined automatically from this information using computer stored characterizing tables or groups of curves for the individual pneumatic muscles, wherein a position of the at least one pivotable lever and the contact surface is calculated automatically either from the measured lengths of the individual pneumatic muscles and by geometric conversion or by direct position measurements on parts movable relative to one another, and wherein the forces on the at least one pivotable lever and on the contact surface are calculated automatically from the forces on the individual pneumatic muscles by geometric conversion.

14. The robot arm as recited in claim 12, wherein an actual position of the contact surface is detected directly by the controller.

15. The robot arm as recited in claim 12, wherein the robot arm is attached to one side of a piece of furniture and offers a contact surface for an extremity of a person located on the piece of furniture.

16. The robot arm as recited in claim 1, wherein the robot arm is at least partly underwater.

17. The robot arm as recited in claim 1, wherein the at least one pivoted lever includes a plurality of interlinked pivoted levers.

18. The robot arm according to claim 17, wherein the controller controls a force exerted by each of the plurality of interlinked pivoted levers.

19. The robot arm as recited in claim 17, wherein the base of one of the interlinked pivoted levers is rigidly connected to the pivotable piece of a next one of the interlinked pivoted levers.

20. The robot arm as recited in claim 1, further comprising: providing a visual or acoustic display of the deviation.

21. A robot arm, comprising:
at least one pivoted lever, the at least one pivoted lever including a support, a base, a pivotable piece, and a plurality of pneumatic muscles, the base being connected to a first end of the support, the pivotable piece being pivotably mounted on a second end of the support, the pneumatic muscles extending from the base to the pivotable piece;
a controller that controls a pressure applied to each of the pneumatic muscles and controls a force exerted by the at least one pivoted lever, wherein the controller responds to an externally acting force on the robot arm over time during a plurality of monitored passes of the robot arm through a movement range using profiles prepared for the plurality of monitored passes, wherein, during a first monitored pass, the controller prepares a first profile of a first actual path of the at least one pivoted lever as affected by the externally acting force, wherein the controller establishes a reaction force in at least one of the plurality of pneumatic muscles that counteracts a deviation between the first actual path of the at least one pivoted lever and a pre-programmed setpoint path of the at least one pivoted lever, wherein the reaction force is applied during at least one second monitored pass after the first monitored pass, wherein, during the at least one second monitored pass, the controller prepares a second profile of a second actual path of the at least one pivoted lever as affected by the externally acting force and the reaction force, wherein the reaction force established for any subsequent monitored pass after the first monitored pass is dependent upon an amount of the deviation during a preceding monitored pass.

22. The robot arm as recited in claim 21, wherein the pivotable piece is pivotable about at least two axes.

23. The robot arm as recited in claim 21, wherein the at least one pivoted lever includes a plurality of interlinked pivoted levers.

24. The robot arm according to claim 23, wherein the controller controls a force exerted by each of the plurality of interlinked pivoted levers.

25. A robot arm, comprising:
a plurality of interlinked pivoted levers, each of the interlinked pivoted levers including a support, a base, a pivotable piece, and at least one pneumatic muscle, the base being connected to a first end of the support, the pivotable piece being pivotably mounted on a second end of the support, the at least one pneumatic muscle extending from the base to the pivotable piece;
a controller that controls a force exerted by each of the interlinked pivoted levers, wherein the controller responds to an externally acting force on the robot arm over time during a plurality of monitored passes of the robot arm through a movement range using profiles prepared for the plurality of monitored passes, wherein, during a first monitored pass, the controller prepares a first profile of a first actual path of the plurality of interlinked pivoted levers as affected by the externally acting force, wherein the controller establishes a reaction force in at least one pneumatic muscle of at least one of the plurality of interlinked pivoted levers that counteracts a deviation between the first actual path of the plurality of interlinked pivoted levers and a pre-programmed setpoint path of the plurality of interlinked pivoted levers, wherein the reaction force is a lied during at least one second monitored pass after the first monitored pass, wherein, during the at least one second monitored pass, the controller prepares a second profile of a second actual path of the plurality of interlinked pivoted levers as affected by the externally actin force and the reaction force, wherein the reaction force established for an subsequent monitored pass after the first monitored pass is dependent upon an amount of the deviation during a preceding monitored pass.

26. The robot arm as recited in claim 25, wherein each pivotable piece is pivotable about at least two axes.

27. The robot arm as recited in claim 25, wherein the controller controls a pressure applied to the at least one pneumatic muscle of each of the interlinked pivoted levers.

28. The robot arm as recited in claim 25, wherein the controller controls a position of each of the interlinked pivoted levers.

* * * * *